United States Patent [19]
Asai et al.

[11] Patent Number: 5,697,332
[45] Date of Patent: Dec. 16, 1997

[54] COMBUSTION CONTROLLER FOR A SPARK IGNITION TYPE TWO-CYCLE ENGINE

[75] Inventors: Masahiro Asai; Yoichi Ishibashi; Shinichi Isomura; Osamu Kudo; Kenji Nishida, all of Saitama-ken, Japan

[73] Assignee: Honda Giken Kogyo Kabushiki Kaisha, Tokyo, Japan

[21] Appl. No.: 633,519

[22] Filed: Apr. 17, 1996

Related U.S. Application Data

[63] Continuation of Ser. No. 267,497, Jun. 29, 1994, abandoned.

[30] Foreign Application Priority Data

| Jun. 30, 1993 | [JP] | Japan | 5-187488 |
| Nov. 27, 1993 | [JP] | Japan | 5-321032 |

[51] Int. Cl.⁶ ............ F02B 9/00; F02B 11/00; F02B 25/20
[52] U.S. Cl. .................... 123/65 PE; 123/65 V
[58] Field of Search .................. 123/65 PE, 65 P, 123/65 V

[56] References Cited

U.S. PATENT DOCUMENTS

| 4,969,329 | 11/1990 | Bolton et al. | 123/65 PE |
| 4,993,373 | 2/1991 | Klomp et al. | 123/65 PE |
| 5,063,887 | 11/1991 | Ozawa et al. | 123/65 PE |
| 5,190,006 | 3/1993 | Motoyama et al. | 123/65 PE |
| 5,373,816 | 12/1994 | Asai et al. | 123/65 PE |

FOREIGN PATENT DOCUMENTS

| 0287038 | 10/1988 | European Pat. Off. . |
| 2515260 | 5/1982 | France . |
| 2599083 | 11/1987 | France . |
| 56-38766 | 9/1981 | Japan . |
| 56-54336 | 12/1981 | Japan . |
| 62-23523 | 7/1985 | Japan . |
| 3-33426 | 6/1990 | Japan . |

*Primary Examiner*—Marguerite McMahon
*Attorney, Agent, or Firm*—Birch, Stewart, Kolasch & Birch, LLP

[57] ABSTRACT

A combustion controller for a two-cycle engine which enables to cause self firing always at the optimum timing is provided. The combustion controller comprises an exhaust control valve 15 provided in the vicinity of an exhaust port 7 of the two-cycle engine 1 and capable of fully closing the exhaust port and driving control means 47, 38, 39, 40 and 37 to drive the exhaust control valve 15 according to a control map giving an exhaust opening ratio $\theta_e$ depending at least on the engine speed and the throttle valve opening ratio $\theta_{th}$ in order to control the pressure in the cylinder during up-stroke of the piston 8. The exhaust control valve 15 is formed by a thin shell-like member comprising an exhaust control portion 35 substantially along the cylinder curvature in the exhaust port 7 and wider than the whole width of the exhaust port and a swinging arm portion 34 for connecting at least a side of the exhaust control portion and the rotational shaft 33 perpendicular to the cylinder axis and accommodated in a receiving recess formed in the cylinder block. This receiving recess is communicated with the exhaust passage extending from the exhaust port 7 only in the working zone of the exhaust control portion.

5 Claims, 12 Drawing Sheets

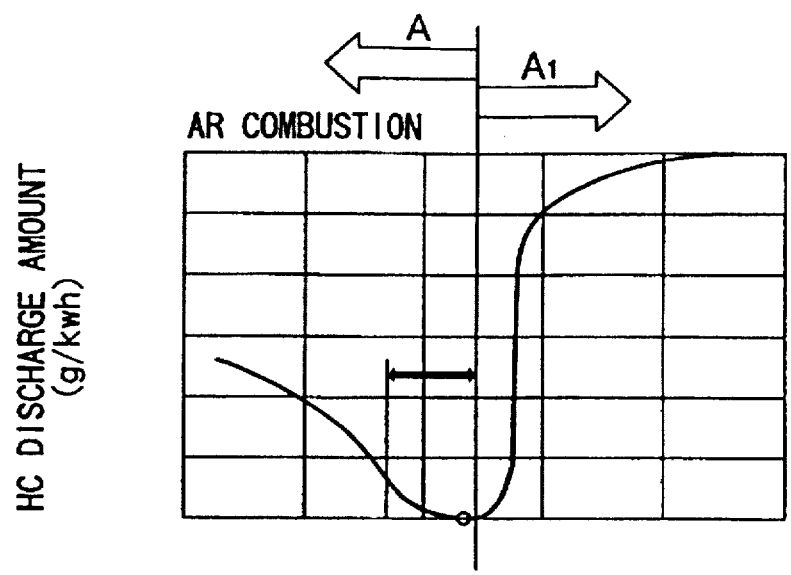
FIG.12A
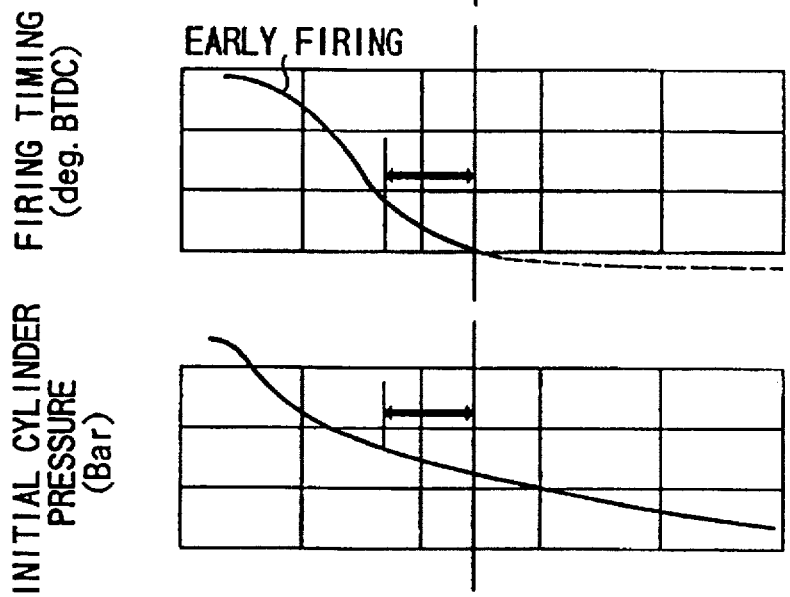
FIG.12B
FIG.12C
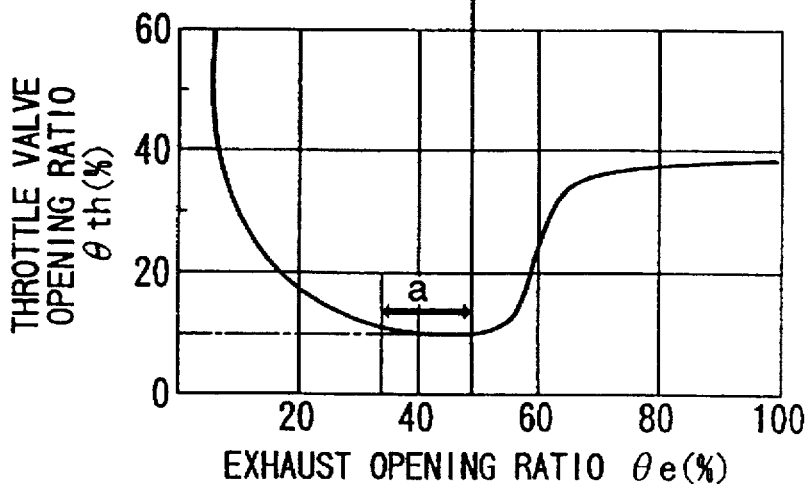
FIG.12D

COMBUSTION CONTROLLER FOR A SPARK IGNITION TYPE TWO-CYCLE ENGINE

This application is a continuation of application Ser. No. 08/267,497 filed on Jun. 29, 1994, now abandoned.

BACKGROUND OF THE INVENTION

1. Field of the Invention

The present invention relates to a combustion controller for a spark ignition type two-cycle engine which causes, at least for low load operation, combustion of the fresh mixture in the combustion chamber by self firing, i.e. active thermal atmosphere combustion.

2. Description of the Related Art

In a spark ignition type two-cycle engine in which an exhaust port and a scavenging port opened and closed by a piston are formed in an inner peripheral surface of a cylinder hole, fresh mixture compressed in a crank chamber is fed from the scavenging port into a cylinder chamber, and burnt gas is discharged out of the exhaust port so that the fresh mixture compressed in the cylinder chamber is fired by means of an ignition plug, irregular combustion due to accidental miss-firing often occurs under low to medium load. This may result in abnormal engine vibration and increased unburnt hydrocarbon content in the exhaust gas, which leads to increased fuel consumption.

To solve the above problem, active thermal atmosphere combustion has been proposed. The active thermal atmosphere combustion is a method to obtain a good combustion even under a low load by activating the fresh mixture in the combustion chamber with the thermal energy engine contained in the residual gas of the previous cycle for much easier ignition and causing self firing at the end of compressing.

For example, Japanese Patent Publication No. 38766/1981 discloses a spark ignition type two-cycle engine utilizing the above mentioned active thermal atmosphere combustion. In this engine, fresh mixture is flowed at a high speed in the scavenge passage so as to sufficiently evaporate liquid fuel, and then, at a much lower speed, fed to the combustion chamber so as to generate radicals in the gaseous phase at the area where fresh mixture makes contact with residual burnt gas in the combustion chamber.

Thus generated active thermal atmosphere is kept until the end of the compression stroke for self firing without an ignition plug. To maintain the active thermal atmosphere status until the end of the compression stroke, it is necessary to largely reduce disturbance and flow of the residual burnt gas in the combustion chamber. Accordingly, the exhaust passage is provided with an exhaust control valve to prevent rapid discharge of the exhaust gas from the exhaust port or exhaust pulsation interference, which may cause such disturbance or flow.

Since the exhaust control valve is provided to reduce disturbance and flow of the above residual burnt gas in low load operation with active thermal atmosphere combustion, it is gradually opened until the ratio of the opened area of the throttle valve (throttle valve opening ratio) reaches 30% and kept fully open when the opening ratio of the throttle valve exceeds 30% for high load operation. Accordingly, when the engine is used only under low load, this exhaust control valve can be replaced by a contraction with a fixed contraction area.

Besides, a spark ignition type two-cycle engine suffers "blow-by", where a part of fresh mixture is discharged out of the exhaust port in an up-stroke of the piston during the period from the closure of the scavenging port to the closure of the exhaust port. In order to reduce the blow-by of fresh mixture, the exhaust port is provided with an exhaust control valve so that the upper part of the exhaust port is closed for low load operation of the engine while the exhaust port is fully open for medium to high load operation and the timing of opening and closing for the exhaust port can be changed variously.

As such an exhaust control valve, Japanese Utility Model Publication No. 54336/1981 discloses a rotary control valve with a body portion substantially of a drum shape with a recessed arc along the inner peripheral wall of the cylinder, and the surface of the body portion is positioned is close as possible to an exhaust port. The body surface of the control valve substantially functions as an upper edge of the exhaust port and the body portion is scooped out so as to have substantially the same shape as the wall surface of the exhaust passage when the control valve is fully open.

Japanese Patent Application Laid-open Publication No. 23523/1987 discloses an exhaust control valve positioned above an exhaust passage which extends outward from an exhaust port opening to an inner surface of a cylinder, with a control surface having substantially the same curvature as the inner surface of the cylinder and matching to the inner surface of the cylinder at the swinging end of the valve body supported for swinging by a shaft disposed perpendicularly to the cylinder axis. The upper part of the exhaust passage is provided a recess to receive the valve body when the exhaust port is fully opened.

Further, Japanese Patent Application Laid-open Publication No. 33426/1991 also discloses an exhaust control valve in which, similarly to the former, a control surface (a flow shutoff cover) is provided at the swinging end of a valve body (main body) supported for swinging within an exhaust passage. In the just mentioned publication, the control surface is in the form of a flexible sheet, which is accommodated in a slot-like cavity provided in the upper wall of the exhaust passage.

FIGS. 7 and 8 of the aforementioned publication show an arrangement where a housing is provided within an exhaust passage, and said slot-like cavity is formed by a clearance between the outer surface of the upper wall of the housing and the inner surface of the upper wall of the exhaust passage. The housing is provided within the exhaust passage with both side walls thereof placed in contact with both side walls of the exhaust passage. The valve body for swinging the control surface is disposed inside of the exhaust passage along the inner surface of the housing side wall.

The spark ignition type two-cycle engine utilizing active thermal atmosphere combustion as mentioned above has not been put into industrial practice yet. This is because of a concern about detonation phenomenon due to early firing, since the opening of the exhaust control valve or the scavenging control valve is not controlled corresponding to the engine operation status, and the firing timing is not controlled positively.

Active thermal atmosphere comustion forms a self control system where the firing timing is determined by the pressure and the temperature in the cylinder at the beginning of compression and the gas temperature at the end of the combustion atarted by such firing is fed back as the temperature in the cylinder. When such a system converges to converge the firing timing in a certain range, active thermal atmosphere combustion is sustained and stabilized.

For the active thermal atmosphere combustion engine, however, it is not sufficient just to sustain active thermal atmosphere combustion or to converge such system in order to obtain a good performance including good fuel consumption, exhaust emission, revolution stability and engine durability. It is important to control the firing timing as in other spark ignition engines.

A conventional active thermal atmosphere combustion engine as described above converges the system with operation of an exhaust control valve resulting in change of the cylinder pressure and thereby causes active thermal atmosphere combustion, but does not positively control the firing timing. Therefore, if the engine is arranged to provide the optimum cylinder pressure for low speed and low load operation, it will have active thermal atmosphere combustion with too early firing for high speed middle load operation, which may adversely affect the durability, exhaust emission and fuel consumption of the engine.

Next, in any of the aforementioned conventional exhaust control valve, a working member is positioned within the exhaust passage. Therefore, the sectional shape or the inner surface shape of the exhaust passage varies from a predetermined shape determined in terms of performance due to the presence of the working members and is varied by even the operation of the working members, which reduces the output.

SUMMARY OF THE INVENTION

It is an object of the present invention to always secure the optimum firing timing during active thermal atmosphere combustion, and thereby reduce the fuel consumption and the exhaust emission of the active thermal atmosphere combustion engine and prevent abnormal combustion such as detonation due to early firing.

Another object of the invention is to improve the performance of the engine using an exhaust control valve which can correctly control the exhaust without reduction of the output.

According to an aspect of the present invention, a combustion controller for a spark ignition type two-cycle engine causing combustion of fresh mixture in a combustion chamber by self firing at least for low load operation comprises an exhaust control valve which is provided in an exhaust passage and capable of substantially fully closing the exhaust passage, and driving control means which drives the exhaust control valve to obtain a predetermined exhaust opening ratio depending at least on an engine speed and a throttle valve opening ratio for controlling pressure in a cylinder during up-stroke of a piston in order to control timing of the self firing.

With the configuration as described above, the combustion controller of the present invention properly controls the pressure in the cylinder (hereinafter called as cylinder pressure) when the exhaust port is closed by the piston at least for low load operation, by driving the exhaust control valve to obtain the exhaust opening ratio corresponding to the engine speed and throttle valve opening ratio and thereby realize self firing of fresh mixture in the combustion chamber at a timing preferable for engine operation.

Such active thermal atmosphere combustion with firing timing positively controlled to timing preferable for engine operation is hereinafter referred as "AR combustion (Active Radical combustion)".

As described above, firing timings in active thermal atmosphere combustion are determined by the pressure and temperature in the cylinder at the beginning of the combustion. However, the pressure in the cylinder depends on the gas status in the cylinder. Even if the firing timings converge and the active thermal atmosphere combustion is sustained, a change in the gas status in the cylinder changes the cylinder pressure, which affects the firing timing and this may result in too early firing. In the present invention, however, control of the exhaust opening ratio corresponding to the engine speed and the throttle valve opening ratio enables control of the cylinder pressure at the beginning of compression at a value for optimum firing timing corresponding to the gas status in the cylinder.

Specifically, the cylinder pressure is controlled by setting the exhaust control valve at a predetermined exhaust opening ratio based on a control map prepared in advance for AR combustion.

Factors to represent the gas status in the cylinder of a spark ignition type two-cycle engine after closure of the exhaust port usually include the charging efficiency ($\eta_c$), scavenging efficiency ($\eta_s$), air/fuel ratio (A/F), and the cylinder temperature. Among them, the charging and scavenging efficiencies can be predicted using other parameters including the engine speed, throttle valve opening ratio, ambient temperature and atmospheric pressure, for engines in the same form.

According to the present invention, at least the engine speed and the throttle valve opening ratio are picked up as the factors representing the status of the gas in the cylinder, and a control map gives the exhaust opening ratio corresponding to the combination of such factors.

According to another aspect of the present invention, the exhaust control valve is constructed in such a manner that a rotational shaft extending at a right angle to a cylinder axis and a valve body supported on the rotational shaft are provided in an exhaust passage extending from an exhaust port opening to an inner peripheral surface of a cylinder hole and the valve body varies a height of an upper edge of the exhaust port. The valve body is formed in a thin shell-like member comprising an exhaust control portion which is substantially along a cylinder curvature at the exhaust port and is wider than the whole width of the exhaust port and a swinging arm portion connecting at least a side of the exhaust control portion and the rotational shaft. A receiving recess to receive the whole valve body is formed in a cylinder block formed with the exhaust passage, and the receiving recess is communicated with the exhaust passage only in a working zone of the exhaust control portion of the valve body and the swinging arm portion of the valve body is always accommodated in the receiving recess.

According to the present invention, the swinging arm portion of the valve body is always received in the receiving recess communicated with the exhaust passage only in the working zone of the exhaust control portion, and the shape of the exhaust passage is not affected by the installation and operation of the valve body. Therefore, it is possible to prevent the output from being lowered.

Further, the valve body is formed from a thin shell-like member so that the exhaust control portion of the valve body can be moved up and down at a position sufficiently close to the exhaust port. Therefore, it is possible to precisely control the exhaust timing.

BRIEF DESCRIPTION OF THE DRAWINGS

FIG. 12 is a graph to show the relation between the exhaust opening ratio and each of the throttle valve opening ratio, the initial cylinder pressure, the firing timing and the HC discharge amount for a fixed load;

DESCRIPTION OF THE PREFERRED EMBODIMENT

Preferred embodiments of the present invention will be described below starting with the structure of an exhaust control valve.

Figure 1:
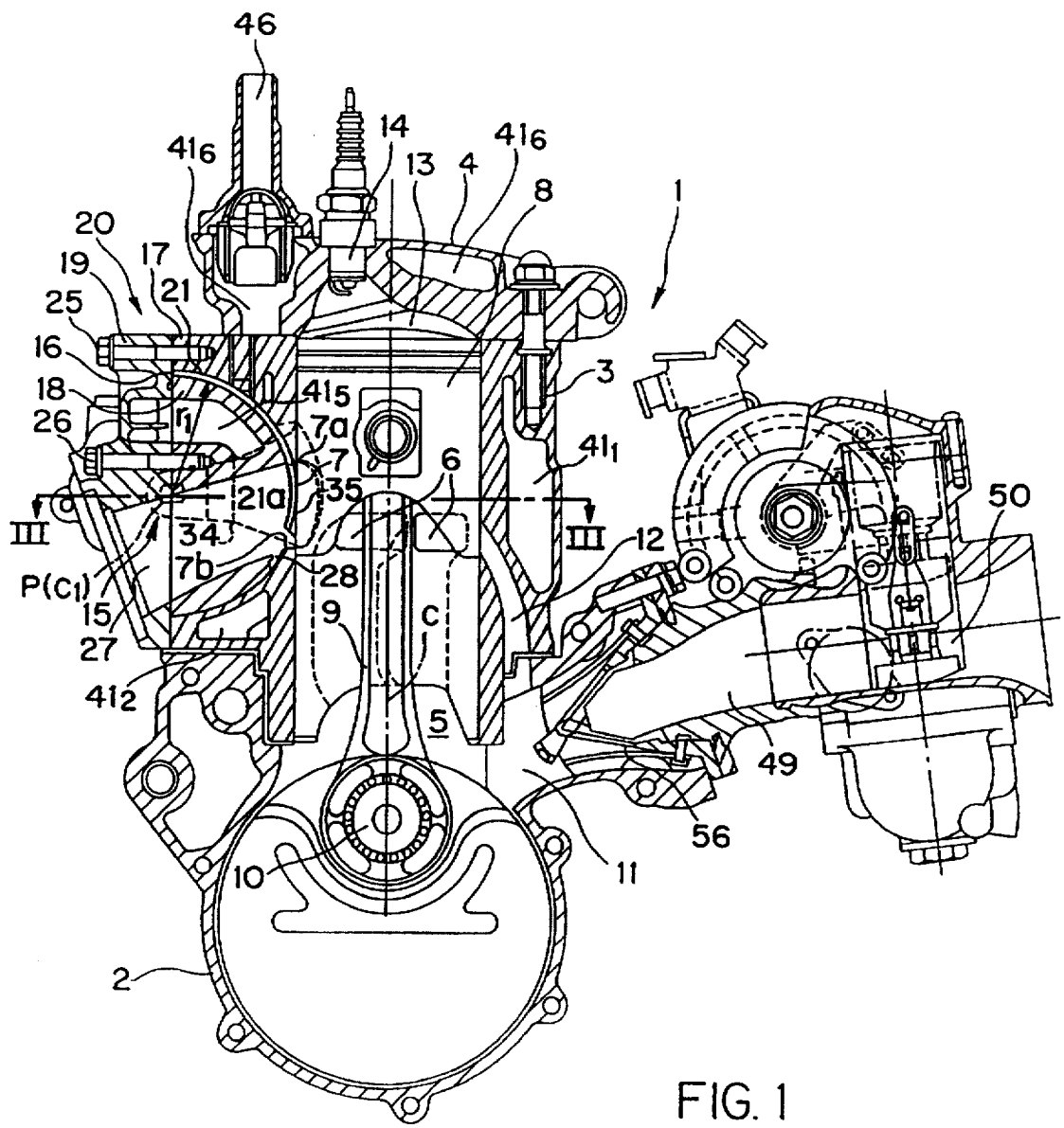
FIG. 1 is a side view of a spark ignition type two-cycle engine provided with an combustion controller according to the present invention with a longitudinal section of its cylinder.

FIG. 1 is a sectional view of a spark ignition type two-cycle engine 1 for a motorcycle provided with an exhaust control Valve according to the present invention. The reference numeral 2 designates a crank case, 3 a cylinder block, and 4 a cylinder head. A scavenging port 6 and an exhaust port 7 are open to an inner peripheral surface of a cylinder hole 5 formed in the cylinder block 3 and opened and closed by a piston 8 slidably moves up and down in the cylinder hole 5. The reference numeral 9 designates a connecting rod and 10 a crank pin.

Fresh mixture taken into the crank case 2 from an intake port 11 during up-stroke of the piston 8 is, at the time of its down-stroke, compressed and fed to a cylinder chamber above the piston 8 via an intake passage 12 and the scavenging port 6. Burnt gas within the cylinder chamber is discharged out of the exhaust port 7. When the scavenging port 6 and then the exhaust port 7 are closed by the upward movement of the piston 8, mixed gas within the cylinder chamber is thereafter compressed by the piston 8 and fired by an ignition plug 14 adjacent to a combustion chamber 13. Under low load, however, the mixed gas is fired by self firing and causes active thermal atmosphere combustion. The recess of the combustion chamber 13 accommodating the ignition plug 14 is offset closer to the exhaust port 7.

The cylinder block 3 with the exhaust port 7 is provided with an exhaust control valve 15. Upward movement of the piston 8 causes a phenomenon called "blow-by", where a part of fresh mixture fed into the cylinder chamber is discharged out of the exhaust port 7 during a period from the closure of the scavenging port 6 to the closure of the exhaust port 7. Pressure waves caused by the exhaust blow down is reflected mainly at a closed end of the exhaust pipe so that positive and negative pressures occur in the exhaust pipe. In a spark ignition type two-cycle engine, the blow-by of the fresh mixture is reduced by arranging occurrence of the positive pressure at the exhaust port to be in conformity with the period from the scavenging port closure to the exhaust port closure. When the exhaust system adjusted to be suitable for the engine speed at the peak of output is placed under medium to low load, the timing of the reflection waves is too early. Thus, by closing the upper part of the exhaust port 7 by the exhaust control valve 15 corresponding to engine speed to delay the timing when the exhaust port opens (blow down timing), the reflection waves can be matched to proper timing to reduce the blow-by of the fresh mixture.

The exhaust control valve comprises a cylinder wall 17 formed with a recess 16, an exhaust passage member 18 mounted within the recess 16, a cover member 19 covering the cylinder wall 17 and the exhaust passage member 18 from the outside and a valve body 20 inserted between the recess 16 and the exhaust passage member 18.

In the longitudinal section of FIG. 1, the recess 16 formed in the cylinder wall 17 is shaped in a semicircle which is in contact with an inner peripheral surface of the cylinder hole 5 and has a radius of $r_1$ and its center at a point P. As will be understood from the cross section of FIG. 3, the radius r within the other longitudinal section parallel with the longitudinal section of FIG. 1 gradually increases to radii $r_2$ on both sides along an axis $C_1$ passing the point P at a right angle to an axis C of the cylinder hole 5, and a line passing through the outer ends of these radii r forms an arc a having substantially the same curvature as the cross sectional shape of the cylinder hole 5. Specifically, the face of the recess 16 as shown in FIG. 1 formes a rotational face obtained by rotating the arc a having substantially the same curvature as the inner peripheral surface of the cylinder hole 5 about the axis $C_1$. Hereinafter, the face portion is called the rotational face portion 21, and the axis $C_1$ is called the rotational axis.

Figure 6:
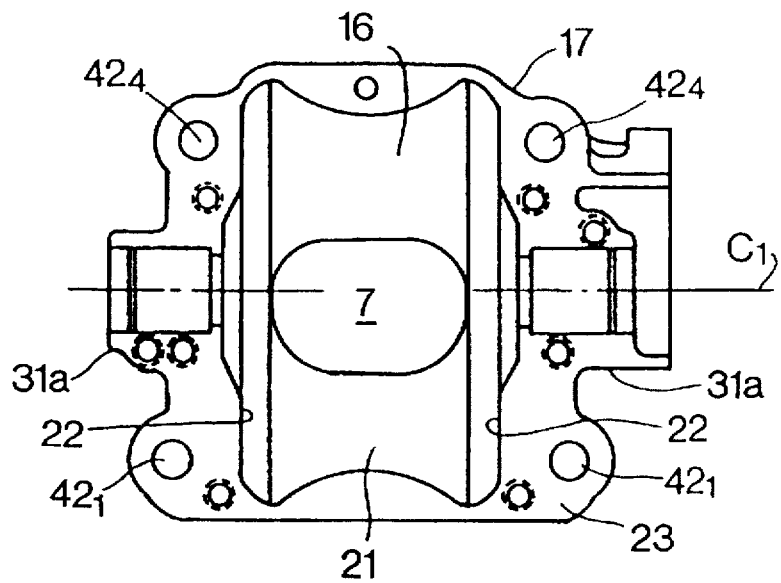
FIG. 6 is a front view of a cylinder wall.

The rotational face portion 21 is connected to end face portions 22 and 22 each having a plane at a right angle to the rotational axis $C_1$ at both ends in the direction of the axis $C_1$. Specifically, the recess 16 is defined by the rotational face portion 21 and the end face portions 22 and 22 and is opened outward. FIG. 6 is a front view of the cylinder wall 17 formed with the recess 16 as described above. The cylinder wall 17 has flat mating face 23 on both sides of the recess 16 (See FIG. 6), and is communicated with the exhaust port 7 at the center of the rotational face portion 21.

The exhaust passage member 18 mounted within the recess 16 has a contour substantially similar to the recess 16. Specifically, the exhaust passage member 18 comprises a rotational face portion 21a along the rotational face portion 21, end face portions 22a and 22a along the end face portions 22 and 22, and an outer end face 24 forming the same surface as the mating face 23 of the cylinder wall 17 along the open face of the recess 16 (See FIG. 8). The exhaust passage member 18 is secured with a bolt 26 to the cover member 19 which is secured to the cylinder wall 17 with a bolt 25 as shown in FIG. 1, and thus is fixed with respect to the cylinder wall 17 and encased in the recess 16. An exhaust passage 27 in communication with the exhaust port 7 is formed therein.

Figure 3:
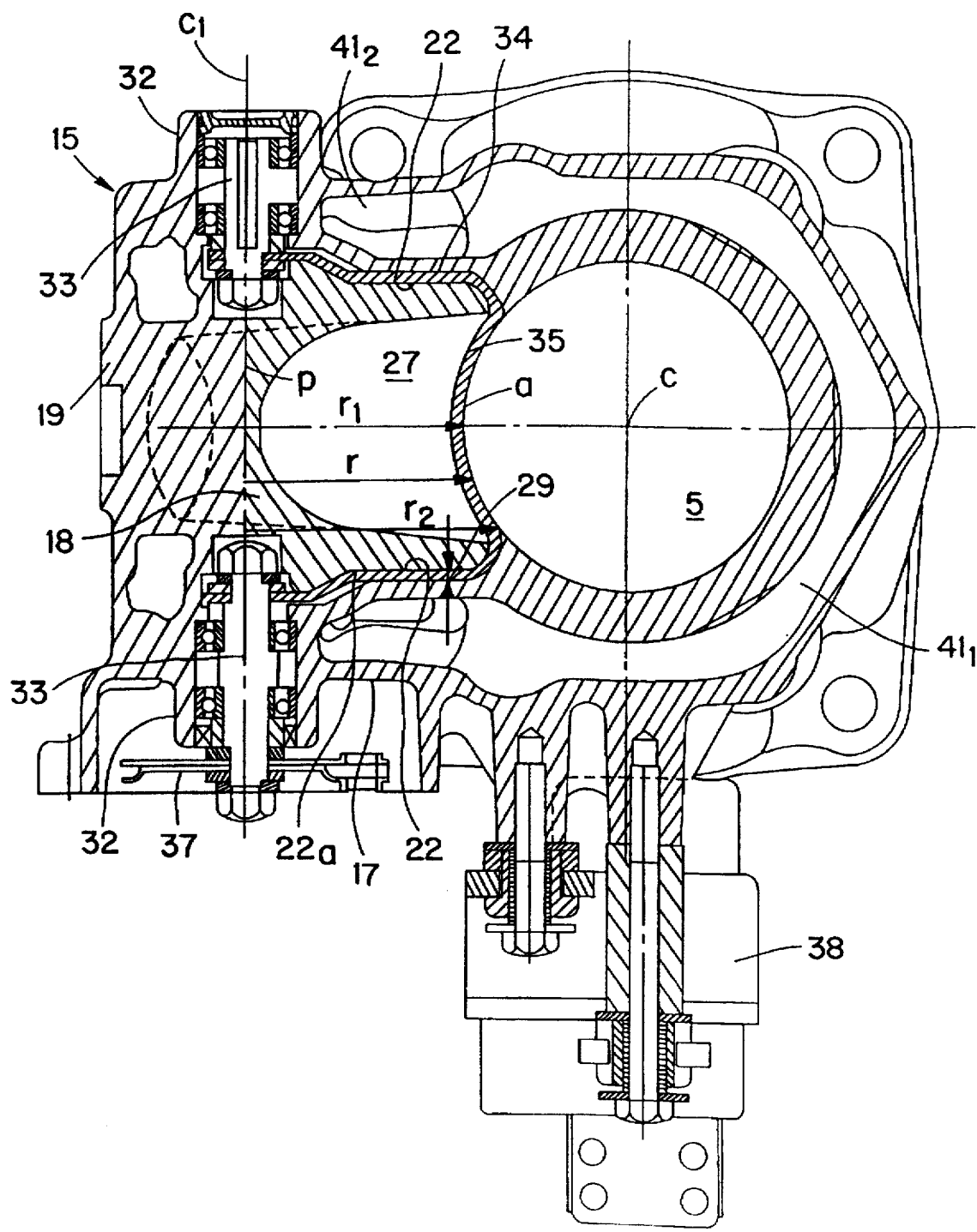
FIG. 3 is a cross sectional view taken on line III—III of FIG. 1.

Between the rotational face portion 21 of the recess 16 and the rotational face portion 21a of the exhaust passage member 18 is provided a clearance 28 having a predetermined spacing above an upper edge 7a of the exhaust port 7. The clearance 28 extends to a position slightly beyond a lower edge 7b of the exhaust port 7 (FIG. 1). Further, also between each end portion 22 of the recess 16 and each end portion 22a of the exhaust passage member 18 is provided with a clearance 29 having a predetermined spacing (FIG. 3).

In this embodiment, the clearance 28 and 29 are arranged to have a spacing to prevent the valve body 20 from being closely contacted with the rotational face portion 21 and the end portions 22 of the recess 16 as well as the rotational face portion 21a and the end portions 22a of the exhaust passage member 18 even when the valve body 20 having a thin plate shape suffers elastic deformation because of exhaust pressure or thermal expansion.

Figure 9:
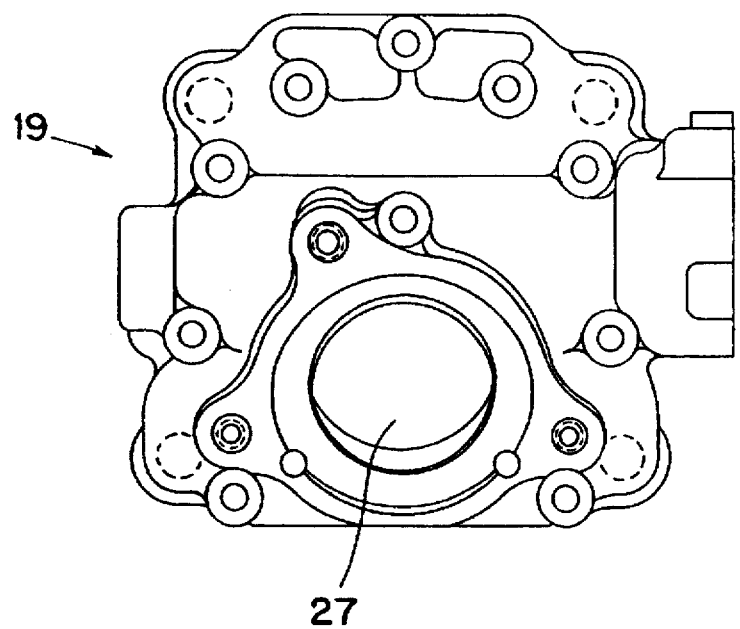
FIG. 9 is a front view of a cover member.
Figure 10:
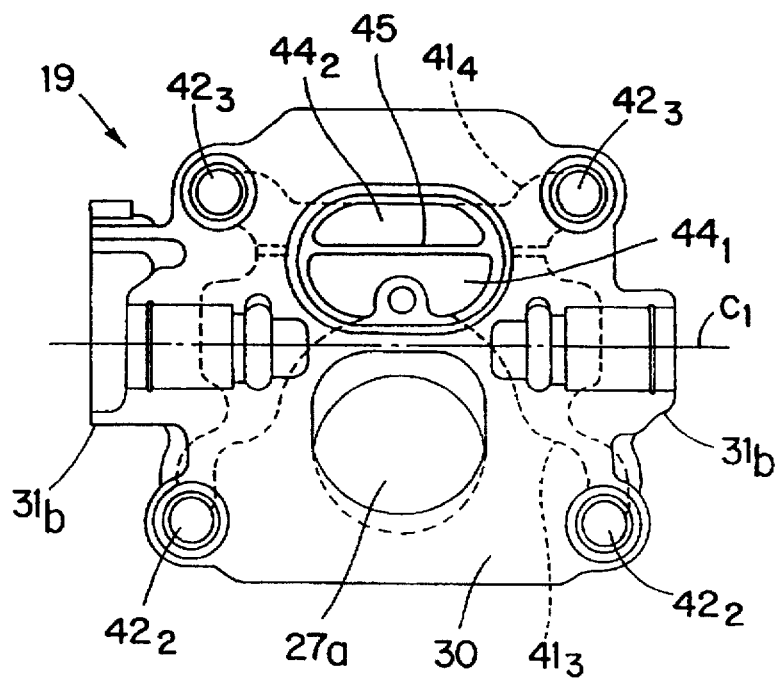
FIG. 10 is a back view of the cover member.

FIG. 9 is an external view of the cover member 19, and FIG. 10 is a rear view thereof. The back surface of the cover member 19 has a flat mating surface 30 flush with the mating face 23 of the cylinder wall 17 and the outer end face 24 of the exhaust passage member 18. The mating face 30 is placed in abutting contact with the mating face 23 and the outer end face 24, and the cover member 19 is secured to the cylinder wall 17 and the exhaust passage member 18 by means of the bolts 25 and 26 as previously mentioned. The cover member 19 is provided with an exhaust passage 27a continuous to the exhaust passage 27 of the exhaust passage member 18, and the exhaust port 7 is connected to an external exhaust pipe not shown via these exhaust passage 27 and 27a.

The mating face 23 (FIG. 6) of the cylinder wall 17 and the mating face 30 (FIG. 10) of the cover member 19 as described above are respectively provided with a pair of bearing boss portions 31a and 31b which are opposed from both sides along the rotational axis $C_1$. When the cylinder wall 17, the exhaust passage member 18 and the cover member 19 are assembled, a pair of bearing bosses 32 are formed by these bearing boss portions 31a and 31b as shown in FIG. 3. The bearing bosses 32 rotatably supports a valve driving shaft (a rotational shaft) 33.

Figure 4:
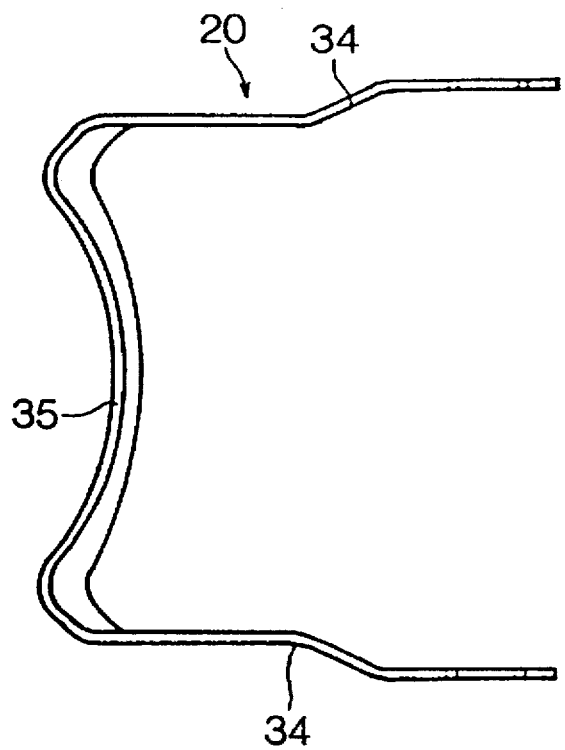
FIG. 4 is an enlarged top view of a valve body.
Figure 5:
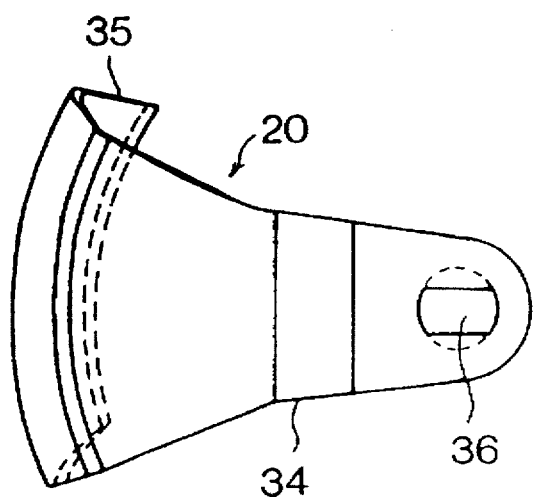
FIG. 5 is an enlarged side view of the valve body.

FIG. 4 is an enlarged top view of the valve body 20 and FIG. 5 is an enlarged side view of the same. As will be further understood from these figures, the valve body 20 is a thin shell-like member formed from a processed metal plate such as a stainless steel plate. It comprises a pair of arm portions (swinging arm portions) 34 and a control face portion (an exhaust control portion) 35 connecting the ends of these arm portions 34 together. The arm portion 34 is provided with a flat engaging hole 36 at its base end. The arm portion 34 is inserted into a clearance 29 formed between the recess 16 and the end face portions 22 and 22a of the exhaust passage member 18 with the engaging hole 36 engaged with a portion chamfered into a similar shape of the valve body driving shaft 33. Thus, the arm portion 34 oscillates integral with the valve body driving shaft 33 within the clearance 29.

The control face portion 35 is formed wider than the whole width of the exhaust port 7 and formed into a rotational surface having the same shape as the aforementioned rotational surface with respect to the rotational face portion 21 of the recess 16. When the arm portion 34 oscillates about the rotational axis $C_1$ integral with the valve body driving shaft 33, the control face portion 35 can be moved in and out of the clearance 28 between the rotational face portions 21 and 21a. Accordingly, the exhaust timing can be adjusted in accordance with the operating conditions by completely encasing the control face portion 35 into the clearance 28 to fully open the exhaust port 7 or projecting the control face portion 35 from the upper edge 7a of the exhaust port 7 to close the upper section of the exhaust port 7.

As will be understood from the foregoing, in the present embodiment, the recess 16 constitutes a receiving recess to receive the whole valve body 20. The receiving recess is communicated with the exhaust passage 27 only in the work zone of the control face portion (exhaust control portion) 35, and the arm portion (swinging arm portion) 34 is always received in the receiving recess i.e. the clearance 29.

The clearance 28 extends to a position beyond the lower edge 7b of the exhaust port 7, and the control face portion 35 can be moved down to such position to fully close the exhaust port 7. Accordingly, the ratio of opening of the exhaust port 7 (exhaust opening ratio) can be freely changed from full opening to full closing. This enables control of the cylinder pressure at the beginning of the compression for AR combustion with optimum firing timings.

Figure 2:
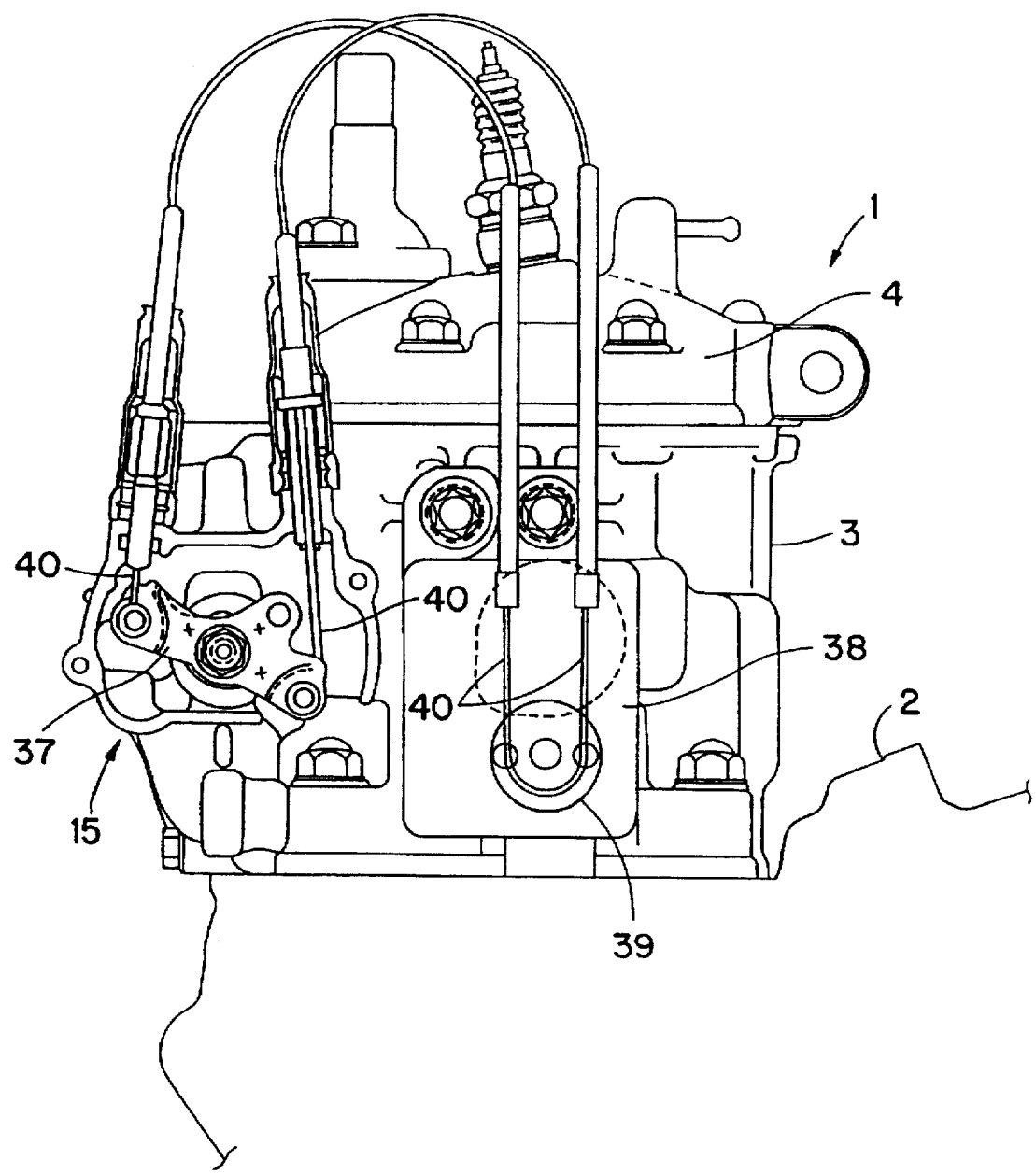
FIG. 2 is a side view of the cylinder for the side opposite to the side shown in FIG. 1.

One valve driving shaft 33 is projected outward from the cylinder block 3, and, at its projecting end, a driving lever 37 for driving the valve body driving shaft 33 is secured as projections from the shaft. FIG. 2 is a side view to show the side of the cylinder block 3 where the driving lever 37 is disposed. As shown in the figure, a servomotor 38 is provided on this side. A driving cable 40 is passed over a pulley 39 provided on an output shaft of the servomotor 38 and the ends of the driving cable 40 are connected to the ends of the driving lever 37. Thus, the opening and closing of the exhaust port 7 by the control face portion 35 of the valve body 20 is controlled by the servomotor 38.

In an exhaust control valve 15 thus configured, the arm portion 34 of the valve body 20 is not positioned in the exhaust passage 27 but disposed outside of the exhaust passage member 18 formed with the exhaust passage 27. Therefore, provision of the valve body 20 and its operation do not change the shape of the exhaust passage 27 so that no lower output results. Further, since the control face portion 35 of the valve body 20 is moved up and down at a position sufficiently close to the exhaust port 7, the exhaust timing can be controlled correctly, in addition the exhaust port 7 can be fully closed as described above.

The exhaust control valve 15 consisting of the cylinder wall 17, the exhaust passage member 18, the cover member 19 and the valve body 20 is wholly cooled by circulating cooling water. A cooling water circulating system within the exhaust control valve 15 will be described hereinafter.

Figure 7:
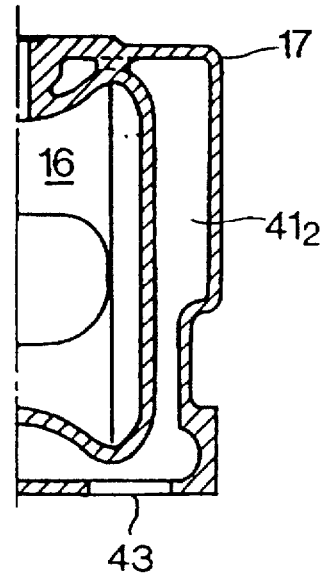
FIG. 7 is a cross sectional view taken on line VII—VII of FIG. 3.

First of all, the cylinder wall 17 is provided with a cooling water passage $41_2$ in communication with a cooling water passage $41_1$ provided in the cylinder block 3 encircling the cylinder hole 5 (FIGS. 1 and 3). As shown in FIG. 7, the cooling water passage $41_2$ is disposed so that it surrounds the recess 16 from the bottom toward the both sides thereof. As shown in FIG. 6, it is communicated with connecting ports $42_1$ and $42_1$ which are open to the lower portions on both sides of the mating face 23 of the recess 16. Cooling water is introduced into the cooling water passages $41_1$ and $41_2$, through a cooling water inlet 43 (FIG. 7).

Connecting ports $42_2$ matched to the connecting ports $42_1$ are provided in the mating face 30 of the cover member 19 in contact with the mating face 23 of the recess 16 (FIG. 10), and a cooling water passage $41_3$ in communication with the connecting port $42_2$ is formed inside of the cover member 19. This cooling water passage $41_3$ is opened to the mating face 30 through a opening portion $44_1$. The mating face 30 is also provided with other connecting ports $42_3$ on both sides of the upper part and a cooling water passage $41_4$ in communication therewith is opened to the mating face 30 through a opening portion $44_2$ adjacent to the opening portion $44_1$. The opening portion $44_1$ is separated from the opening portion $44_2$ by a partition 45.

Figure 8:
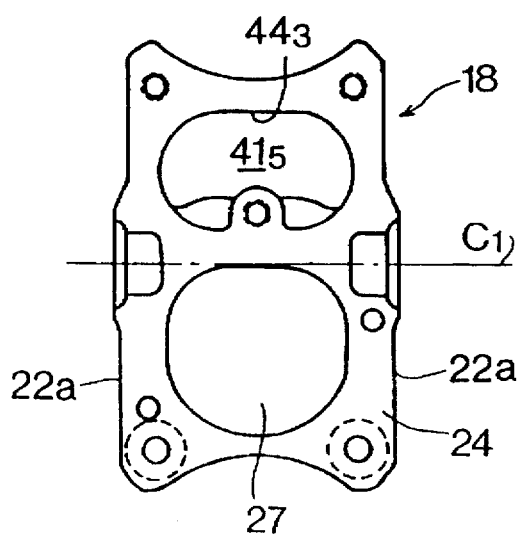
FIG. 8 is a front view of an exhaust passage member.

The exhaust passage member 18 is provided with a cooling water passage $41_5$ which is opened to the outer end face 24 through the opening portion $44_3$ as shown in FIGS. 1 and 8. The cooling water passage $41_5$ has a bag shape and communicates with the outside only at the opening portion $44_3$. The opening portion $44_3$ is matched to the opening portions $44_1$ and $44_2$ of the cover member 19.

The cooling water supplied from the cooling water inlet 43 to the cylinder block 3 flows into the cooling water passage $41_5$ via the cooling water passage $41_2$, the connecting ports $42_1$ and $42_2$, the cooling water passage $41_3$ and the opening portions $44_1$. Then, from the cooling water passage $41_5$, it flows out through the opening portion $44_3$ and enters the cooling water passage $41_4$ through the opening portion $44_2$. During such flowing, the cooling water cools the cylinder wall 17, the cover member 19 and the exhaust passage member 18.

The connecting port $42_3$ of the cover member 19 is matched to the other connecting port $42_4$ (FIG. 6) which is opened to the mating face 23 of the cylinder wall 17. The aforementioned cooling water, via the connecting port $42_3$ and the connecting port $42_4$, enters another cooling water passage (not shown) in the cylinder wall 17. The cooling water is then guided to a cooling water passage $41_6$ (FIG. 1) provided in the cylinder head 4, cools the cylinder head 4 and then is discharged from a cooling water outlet 46.

Figure 11:
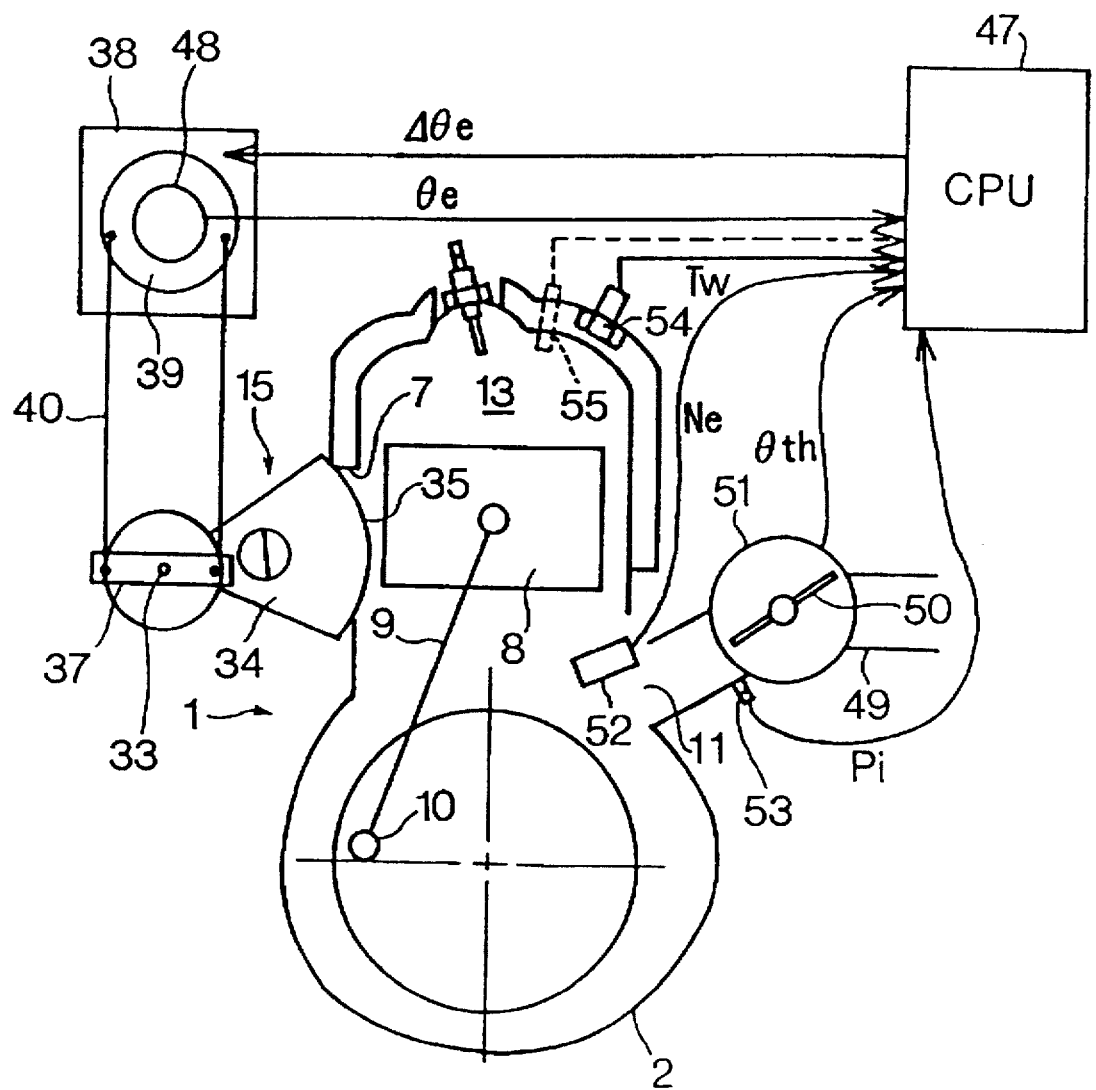
FIG. 11 is a schematic diagram showing a driving control system of the exhaust control valve in the above spark ignition type two-cycle engine.

FIG. 11 is a schematic diagram showing the essential part of the engine 1 as described above, with the same reference numerals at the parts corresponding to the parts in FIGS. 1 to 10 above. FIG. 11 also shows a driving control system to drive the exhaust control valve 15.

The exhaust valve 15 is driven by the servomotor 38 with the pulley 39, the driving cable 40 and the driving lever 37 as described above and its driving amount is determined by the drive signal $\Delta\theta_e$ sent from a CPU 47 to the servomotor 38. The pulley 39 is connected with an exhaust opening ratio sensor 48 comprising a potentiometer, from which the ratio of opening at the exhaust port 7 obtained by the exhaust control valve 15, i.e. the exhaust opening ratio $\theta_e$ as a result of driving is fed back to the CPU 47.

The reference numeral 50 designates a piston type carburetor throttle valve provided at an intake pipe 49 connected to the intake port 11. A reed valve 56, which is a one-directional valve, is mounted to the intake pipe 49 at a position between the intake port 11 and the throttle valve 50. The opening ratio $\theta_{th}$ of the throttle valve 50 is detected by throttle valve opening sensor 51 comprising a potentiometer and input to the CPU 47.

A rider on the motorcycle (not shown) can control acceleration and deceleration of the engine 1 with adjustment of the throttle valve opening ratio $\theta_{th}$ of the throttle valve 50 by rotating the right handgrip (not shown).

Other data also sent to the CPU 47 include the engine speed Ne detected by the engine speed sensor 52, the inlet pipe pressure Pi detected by an inlet pipe pressure sensor 53 and the cooling water temperature Tw detected by a water temperature gauge 54.

The CPU 47 determines the engine operation status from these input data and generates necessary control signals. In the operation range with AR combustion, it operates according to a control map which specifies exhaust opening ratios $\theta_e$ depending on the engine speed Ne and the throttle valve opening ratio $\theta_{th}$ and sends the driving signal $\Delta\theta_e$ determined by the map to the servomotor 38. This exhaust opening ratio $\theta_e$ is determined so that the cylinder pressure controlled thereby provides the optimum firing timing. Such a control map can be prepared, for example, as described below.

However, the signals based on the rider's intention to decelerate the vehicle is input to the CPU 47 by brake or kill-switch operation for example, the exhaust control valve 15 is forcibly opened to an opening ratio at which the AR combustion can not be sustained.

FIG. 12 graphically shows the relation between the exhaust opening ratio $\theta_e$ and the throttle valve opening ratio $\theta_{th}$, the cylinder pressure at the beginning of the compression (initial cylinder pressure), the firing timing and the HC discharge amount under the condition where the engine speed (Ne) is 3000 rpm, the mean effective pressure (PME) is 2 Bar, and the air-fuel ratio (A/F) is 14. Under such condition, the aforementioned AR combustion can be obtained in a range indicated by a white arrow A. In the range A, the exhaust opening ratio $\theta_e$ and the throttle valve opening ratio $\theta_{th}$ are selected as indicated at the bottom of the graph. That is, the exhaust opening ratio $\theta_e$ is selected at about 50% or less.

Under the above condition, when the exhaust opening ratio $\theta_e$ is over 50% (i.e. in the range indicated by a white arrow $A_1$ in the figure), irregular combustion occurs as understood from the large increase in HC discharge amount.

Even in the range A, however, excessively small exhaust opening ratio $\theta_e$ causes early firing, which adversely affects the engine durability, exhaust emission and the fuel consumption. The optimum firing timing without any such adverse effect falls within the range of about 8° to 10° BTDC to TDC. To obtain such firing timing, the exhaust opening ratio $\theta_e$ must be in the range indicated by the black arrows a in the figure. In this embodiment, this range a is around 40%, and the corresponding throttle valve opening ratio $\theta_{th}$ is about 10%. Specifically, for this engine with the engine speed being 3000 rpm and the throttle valve opening ratio being about 10%, the exhaust opening ratio of about 40% provides a low speed and low load operation with AR combustion having the optimum timing of 10° BTDC to TDC and the mean effective pressure of 2 Bar.

Figure 13:
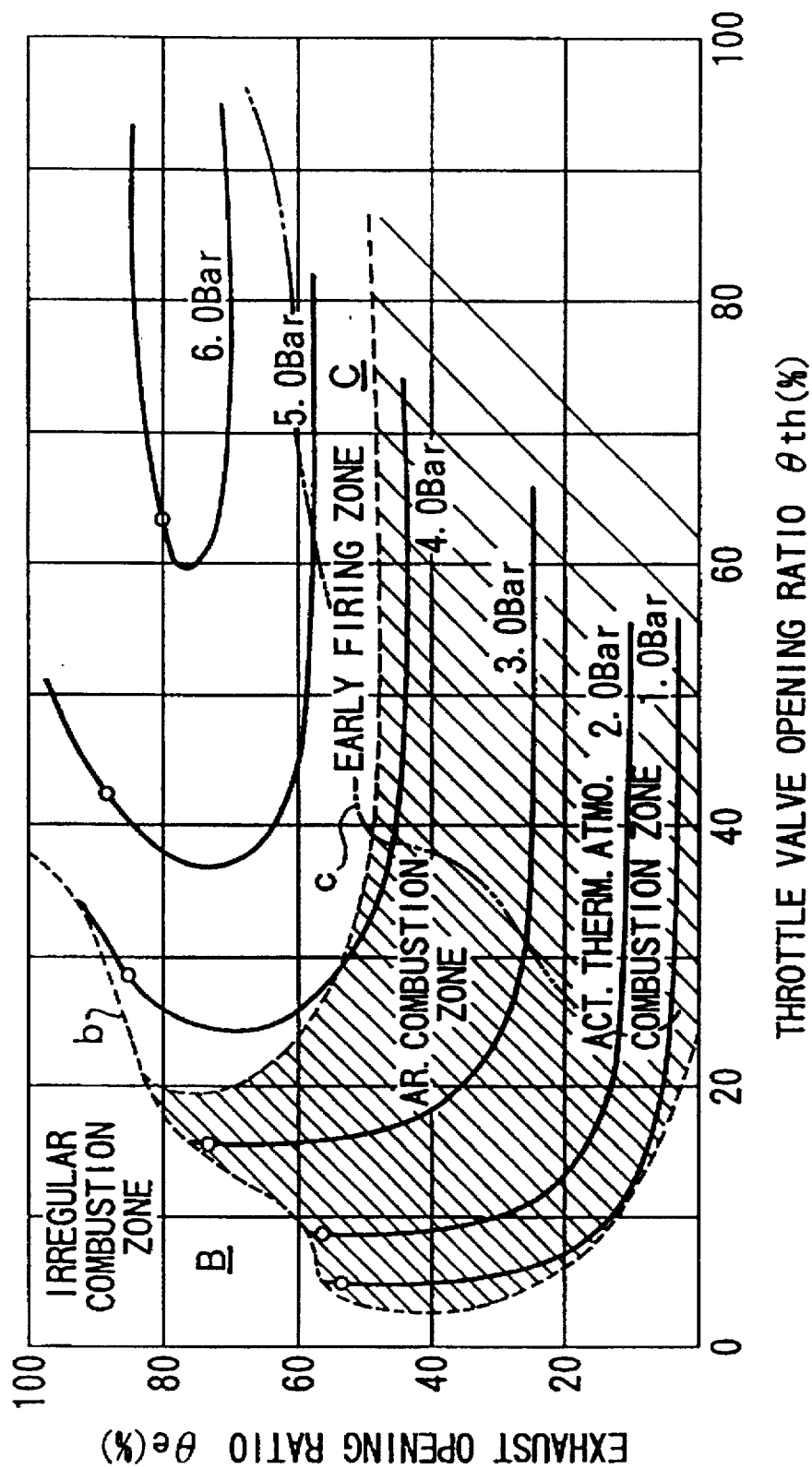
FIG. 13 is a diagram of characteristic curves to show the relation of the mean effective pressure to the exhaust opening ratio and the throttle valve opening ratio.

By changing the PME with keeping the Ne (=3000 rpm) and the A/F (=14) fixed, graphs similar to FIG. 12 can be obtained for various PME values. FIG. 13 shows relations between the throttle valve opening ratio and the exhaust opening ratio based on such graphs. The throttle valve opening ratio is given at the horizontal axis and the exhaust opening ratio at the vertical axis. The iso-PME curve for 2.0 Bar in the figure corresponds to the curve at the bottom in FIG. 12.

Referring to FIG. 13, active thermal atmosphere combustion can be obtained in the shaded zone. The zone B at the upper left of the broken line b is the irregular combustion zone corresponding to the range $A_1$ of FIG. 12. Even in the shaded zone, the zone on the right of the broken line c may cause detonation due to early firing. In addition, in the zone C above the early firing zone and below the broken line c, knocking occurs. Circles given on the iso-PME curves indicate the points of the best fuel consumption (with the least HC discharge) (Refer to the circle in the graph at the top of FIG. 12).

It is understood from FIG. 13 that, for the engine speed of 3000 rpm, when the exhaust opening ratio is in the zone between the broken lines b and c, particularly in the vicinity of the circles in the figure, a good combustion is obtained with stable AR combustion having the optimum firing timing under low to medium load.

Figure 14:
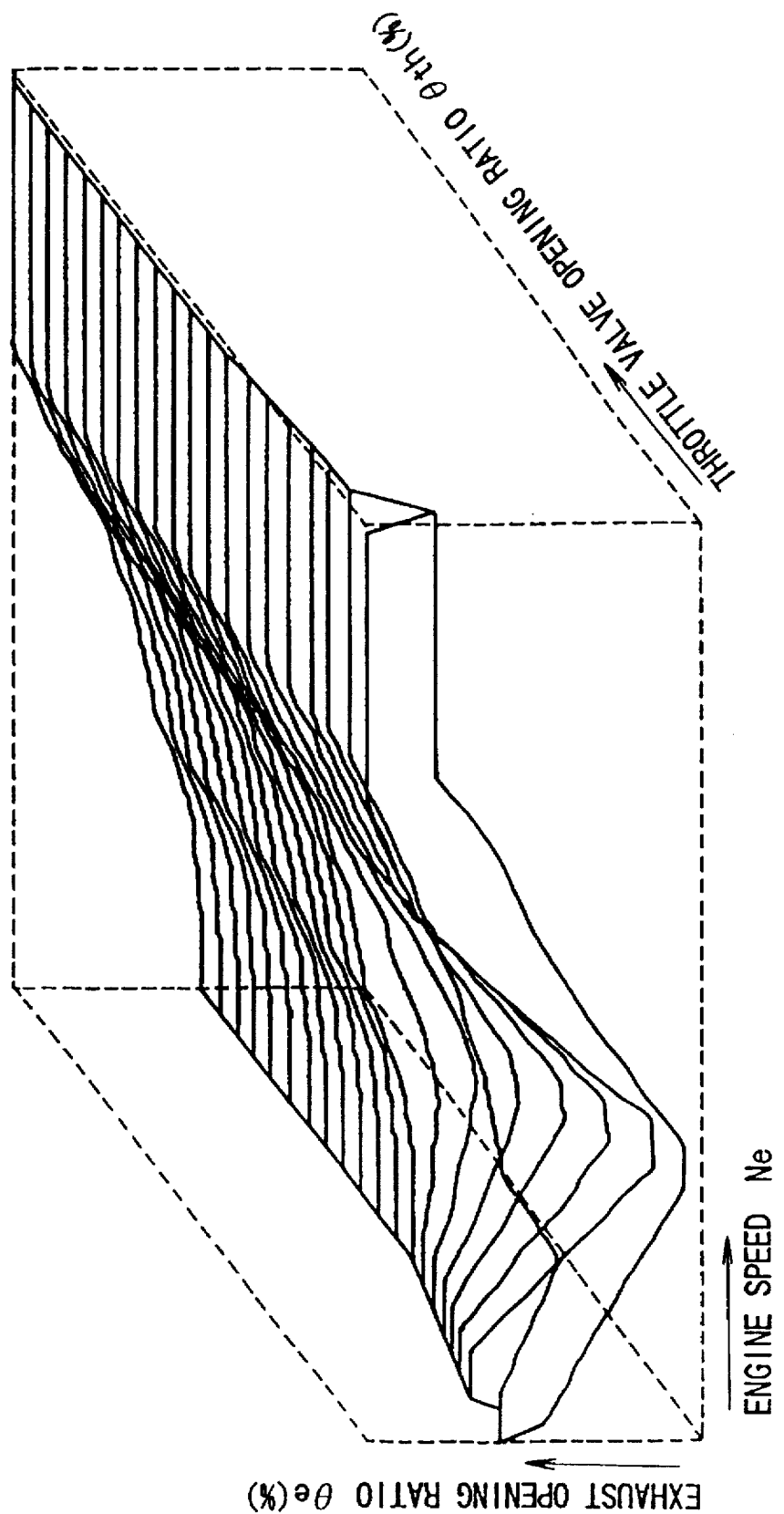
FIG. 14 is a diagram showing an example of a control map.

Similarly, the best exhaust opening ratio $\theta_e$ corresponding to the throttle valve opening ratio can be obtained for various engine speeds Ne. Therefore, using the engine speeds Ne and the throttle valve opening ratios as parameters, a control map indicating the exhaust opening ratio to be set corresponding to any combination of the parameters can be obtained. FIG. 14 is an example of such a control map.

According to such a control map, the CPU 47 searches for the exhaust opening ratio $\theta_e$ suitable for the engine speed Ne and the throttle valve opening ratio $\theta_{th}$ and via the servomotor 38 drives and sets the exhaust control valve 15 so as to provide the required exhaust opening ratio $\theta_e$. As a result, the relative charge is changed and cylinder pressure during piston rising is controlled so as to provide the optimum firing timing.

The above exhaust opening ratio may be further corrected by the inlet pipe pressure signal Pi from the inlet pipe pressure sensor 53 and the cooling water temperature signal Tw from the water temperature gauge 54. Further, timing of maximum indicator pressure generation, firing timing or compression start pressure Pec detected by the indicator or an optical sensor 55 provided adjacent to the combustion chamber 13 can be used for driving control of the above exhaust control valve 15.

Figure 15:
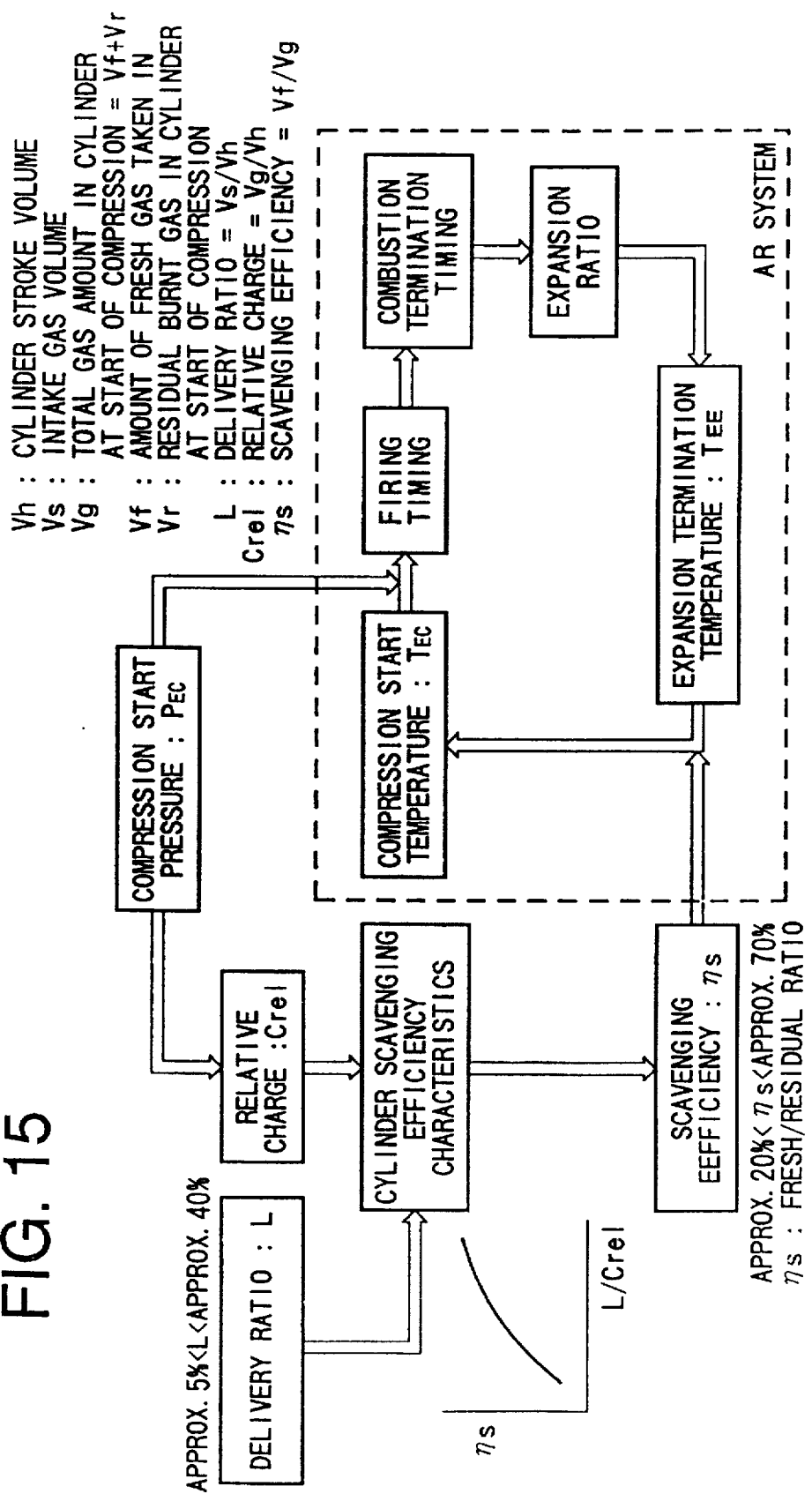
FIG. 15 is an explanatory view to illustrate the principle of the present invention.

Referring now to FIG. 15, requirements for AR combustion where the self firing timing is intentionally controlled in a spark ignition type two-cycle engine are explained.

If the compression start pressure $P_{EC}$ which is the cylinder pressure when the exhaust port 7 is closed is properly set and the corresponding compression start temperature $T_{EC}$ in the cylinder is given, the only one firing timing is determined, because the firing occurs when the temperature in the cylinder is raised by adiabatic compression and reaches the level causing self firing. The combustion terminates when a time required for a predetermined quantity of the fuel in the cylinder to have been burnt elapses after the firing, so that the combustion termination timing is also determined. The combustion termination timing in crank angle determines the expansion ratio, which is the ratio of the combustion termination volume to the exhaust start volume, as well as the expansion termination temperature $T_{EE}$, which affects the compression start temperature $T_{EC}$.

Suppose the relative charge Crel corresponding to the compression start pressure $P_{EC}$ is given as Crel=Vg/Vh (where Vg=Vf+Vr: Total gas amount in cylinder at start of compression, Vf: Amount of fresh mixture taken in, Vr: Residual burnt gas in cylinder at start of compression, Vh: cylinder stroke volume) and the proper delivery ratio is given as L=Vs/Vh (Vs: Intake gas volume) and L is larger than about 5% and smaller than about 40%. With L/Crel under these conditions, if the scavenging efficiency $\eta_s$=Vf/Vg is, for example, a value over about 20% and below about 70%, then the residual gas which is a part of the combustion gas which has reached the expansion termination temperature $T_{EE}$ as above and fresh mixture are properly mixed and the temperature of the mixed gas becomes the predetermined compression start temperature $T_{EC}$. This constitutes an AR system. In this embodiment, by adjusting the exhaust opening ratio by the exhaust control valve 15, the scavenging efficiency $\eta_s$ can be changed.

In this AR system, when the compression start temperature $T_{EC}$ becomes lower because of external disturbance, the firing timing delays with also delaying the combustion termination timing. This causes expansion period to terminate before sufficient expansion of the combustion gas in the cylinder. The expansion termination temperature $T_{EE}$ rises and the compression start temperature $T_{EC}$ rises correspondingly. Thus, a stable control system can be sustained.

The control map of FIG. 14 is specifically described below.

Figure 16:
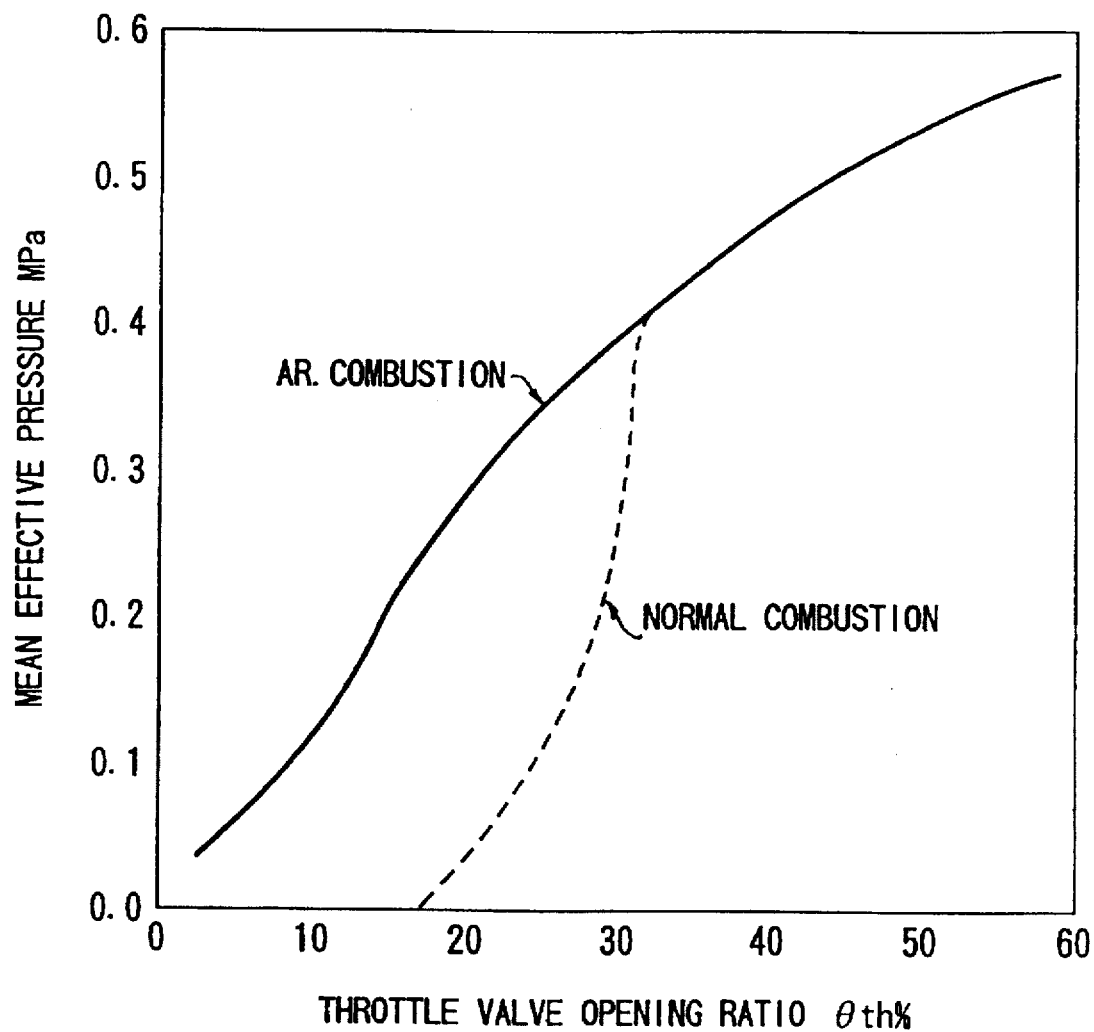
FIG. 16 is a characteristic diagram to show the change in mean effective pressure in the normal combustion status and the AR combustion status with different throttle valve opening ratio for a spark ignition type two-cycle engine.

As shown in FIG. 16, proper control of the exhaust control valve 15 causes AR combustion with maintaining a high level of the effective mean pressure (PME) for the engine. As a result, even if the throttle valve opening ratio $\theta_{th}$ is decreased, the speed of the engine 1 does not lower as intended. To prevent this, in the range where the throttle valve opening ratio $\theta_{th}$ is close to 0 at low to middle engine speed Ne, as the throttle valve opening ratio $\theta_{th}$ decreases, the exhaust opening ratio $\theta_e$ is temporarily lowered. In other words, the exhaust control valve 15 is driven in the direction to be closed as the throttle valve opening ratio decreases and again opened to increase the exhaust opening ratio. By providing such characteristics, the drivability of the engine 1 can be obtained.

Further, it is necessary to open the exhaust control valve 15 larger at the start of the engine 1 than for idle operation status by AR combustion in order to feed more fresh mixture to the combustion chamber 13 with increasing the scavenging efficiency. In FIG. 14, when the engine speed Ne is 0 or close to 0, the exhaust opening ratio $\theta_e$ is increased. When the Ne is increased and reaches the idle operation range, the exhaust opening ratio $\theta_e$ is lowered to a required low valve corresponding to the throttle valve opening ratio $\theta_{th}$ for AR combustion. As the engine speed increases from the idle operation range, the throttle valve opening ratio $\theta_{th}$ is increased more and more. With providing such characteristics, the starting property of the engine can be improved.

Some exhaust systems (an inertia type exhaust system used in an engine with a relatively low output such as a scooter engine, for example) are quite insensitive to the factor Ne. In such cases, the factor Ne can be omitted for convenience. Even with an inexpensive valve such as a butterfly valve, the self firing timing can be controlled. Further, a feedback control using an indicator pressure sensor is also possible. Therefore this invention is not limited to the map control.

According to the present invention, for low load operation range of a spark ignition type two-cycle engine, the scavenging efficiency is for AR combustion can be set by driving the exhaust control valve 15 to the exhaust opening ratio $\theta_e$ corresponding to the engine speed Ne and the throttle valve opening ratio $\theta_{th}$ so as to control self firing to be caused at timing optimum for operation of the engine 1, which enables reduction of fuel consumption and exhaust emission and prevents abnormal combustion such as detonation due to early firing.

In addition, installation of the exhaust control valve of the present invention do not affect the exhaust passage, which prevents the output from being reduced due to any change in the contour of the exhaust passage. Further, its capability of vertically moving the exhaust control portion of the exhaust control valve at a position sufficiently close to the exhaust port enables correct control of the exhaust timing.

What is claimed is:

1. A combustion controller for a spark ignition type two-cycle engine causing combustion of fresh mixture in a combustion chamber by self firing at least for low load operation, comprising:

an exhaust control valve which is provided in an exhaust passage and capable of substantially fully closing said exhaust passage; and driving control means which drives said exhaust control valve to obtain a predetermined exhaust opening ratio for controlling pressure in a cylinder during up-stroke of a piston in order to control timing of said self firing.

2. A combustion controller for a spark ignition type two-cycle engine causing combustion of fresh mixture in a combustion chamber by self firing at least for low load operation, comprising:

an exhaust control valve which is provided in an exhaust passage and capable of substantially fully closing said exhaust passage; and driving control means which drives said exhaust control valve to obtain a predetermined exhaust opening ratio depending at least on an engine speed and a throttle valve opening ratio for controlling pressure in a cylinder during up-stroke of a piston in order to control timing of said self firing.

3. A combustion controller for a spark ignition type two-cycle engine according to claim 2, wherein said driving control means drives said exhaust control valve according to a control map which specifies said exhaust opening ratio depending on said engine speed and said throttle valve opening ratio.

4. A combustion controller for a spark ignition type two-cycle engine according to claims 1, 2, or 3, wherein said exhaust passage extends from an exhaust port opening to an inner peripheral surface of a cylinder hole;

said exhaust control valve comprises a rotational shaft extending at a right angle to a cylinder axis and a valve body supported on said rotational shaft so as to vary a height of an upper edge of said exhaust port;

said valve body is formed in a thin shell-like member comprising an exhaust control portion substantially along a cylinder curvature at said exhaust port and wider than a whole width of said exhaust port and a swinging arm portion connecting at least a side of said exhaust control portion and said rotational shaft; and a receiving recess for receiving said valve body as a whole is formed in a cylinder block formed with said exhaust passage, said receiving recess communicating with said exhaust passage only in a working zone of said exhaust control portion and said swinging arm portion being always accommodated in said receiving recess.

5. A combustion controller for a spark ignition type two-cycle engine according to claims 2 or 3, wherein said exhaust control valve is driven to almost fully close said exhaust passage when the throttle valve opening ratio is very small with exception of zero and the engine speed is low to middle.

* * * * *